Patented Feb. 8, 1938

2,107,955

UNITED STATES PATENT OFFICE 2,107,955

APPARATUS FOR LIQUID LEVEL AND PRESSURE CONTROL

Irvin Earl Nutter and Fletcher Edward Martin, Whittenburg, Tex., and Gerald W. McCullough, Bartlesville, Okla., assignors to Phillips Petroleum Company, Bartlesville, Okla., a corporation of Delaware Application January 29, 1934, Serial No. 708,895

5 Claims. (Cl. 137—68)

This invention relates to apparatus for controlling liquid levels and pressures in various type of fluid containing vessels and fluid containing systems.

In the apparatus, use is made of the Pilot valve mechanism disclosed in a co-pending application, Serial Number 697,300, filed November 9, 1933, by two of the present inventors, Irvin Earl Nutter and Fletcher Edward Martin.

In one particular case this invention relates to the automatic control of the liquid level in a vessel by means of the change in pressure exerted by a pressure fluid upon the liquid contained in a co-acting vessel.

In other cases this invention relates to the automatic control of liquid levels in vessels, wherein the change in level controls the operation of a valve which controls the rate of withdrawal of liquid from the vessel, the control being maintained through co-action with the aforesaid pilot valve mechanism.

Our new invention may be applied successfully to accomplish liquid level control and for pressure regulation in liquid surge tanks, stills, absorbers, and other similar pieces of equipment generally found in natural gasoline plants, refineries, also in connection with oil well separators and in other similar applications, as hereinafter described.

A principal advantage of our new invention is that better control of liquid level and pressure conditions can be obtained with much less equipment than has heretofore been required, with a corresponding saving in installation costs and a great decrease in the difficulties of operation which have been hitherto experienced with conventional types of control equipment.

Other advantages will be apparent as the following description proceeds:

Figure 1:
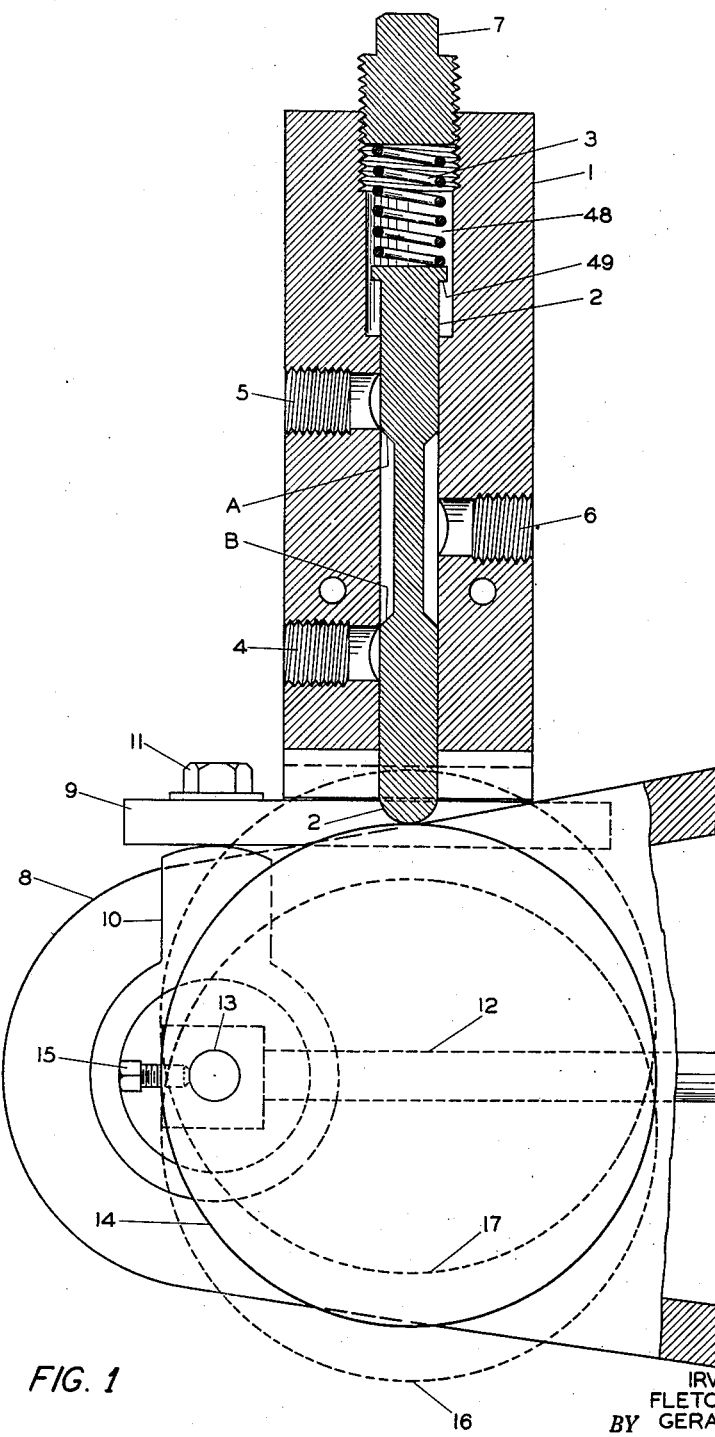
Figure 1 is a detailed drawing of the pilot valve mechanism.

Referring to Figure 1, the valve device consists essentially of the valve body 1, floating valve pin 2, compression spring 3, pressure supply port 4, vent port 5, operating port 6, and valves A and B. An adjustment nut 7 is provided for adjusting the pressure on the spring 3 and for permitting removal of the valve pin 2.

A cylindrical bore 48 passes lengthwise through the valve body 1, the upper portion of the bore 48 being somewhat larger in diameter than the lower portion. The valve pin 2 terminates at its upper end in an enlarged flangelike head 49 which is larger in diameter than the balance of the valve pin 2 and also larger in diameter than the narrower portion of the bore 48, but small enough to fit snugly in the larger portion of the bore 48. In this way the length of travel of the valve pin 2 in a downward direction is restricted. A medial portion of the valve pin 2 is smaller in diameter than the remainder of the pin 2 and flares to the full diameter of the pin 2 at each end of the medial portion, thus forming the valve faces A and B. The distance between the points of widest diameter of the valve faces A and B is equal to the distance between the nearest points of the ports 4 and 5, so that when the valve pin 2 floats in the neutral position as shown in Figure 1, there will be no passage of pressure fluid between any of the ports 4, 5, and 6 as hereinafter described.

The valve body 1 is mounted on a support 9 which is rigidly mounted on the float arm housing 8 by means of the element 10 and the stud bolt 11. The float arm 12 pivots on the element 13 and a circular disc 14 is rigidly fastened to the float arm 12 by means of set screw 15 so as to revolve in an eccentric fashion about the element 13 as the float arm 12 moves up and down with the change in position of the float 19. Dotted circle 16 shows one position of the disc 14 when the float arm lowers and dotted circle 17 shows one position of the disc 14 when the float arm raises. The pressure of the spring 3 at all times holds the valve pin 2 in close contact with the edge of the disc 14 regardless of the position of the disc 14.

Figure 2:
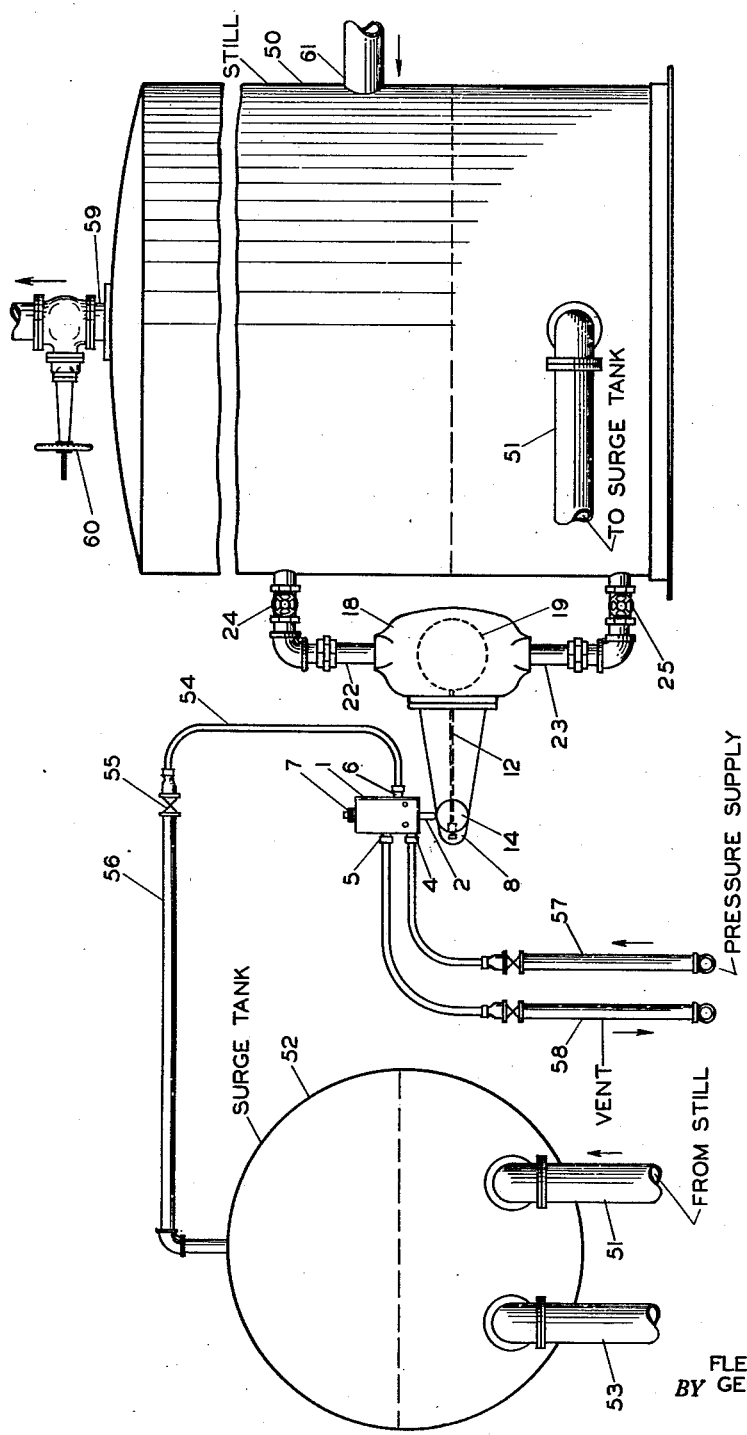
Figure 2 is a diagrammatic arrangement of apparatus for controlling natural gasoline plant still levels by means of the pressure changes in a connected surge tank.

Figure 2 taken in conjunction with Figure 1, represents the apparatus for controlling the level of liquid in a still of a natural gasoline plant by means of the pressure exerted by a pressure fluid on the liquid in a surge tank into which the still discharges.

Referring to Figure 2, the tank 50 represents a still which contains liquid which is discharged through a pipe 51 which leads to heat exchangers, not shown, where the still liquid may be cooled and then to a surge tank 52 into which the still liquid is discharged. A pipe 53 is provided for discharging accumulated liquid from the surge tank 52. A vapor outlet pipe 59 leads from the upper portion of the still 50 and a valve 60 is mounted in the pipe 59 for maintaining any desired pressure on the still 50. A pipe 61 is connected into an intermediate portion of the still 50 for supplying liquid to the still 50. A liquid level control device or float cage 18 is associated with still 50 and is connected thereto by pipes 22 and 23 in which are mounted valves 24 and 25 respectively. The operating port 6 of the pilot valve mechanism is connected by a pipe 54 through a valve 55 and into a pipe 56 which is connected into the vapor space of the surge tank 52. A pressure fluid supply pipe 57 is connected to pressure supply port 4 of the pilot valve mechanism and a pressure fluid vent pipe 58 is connected to pressure fluid vent port 5 of the pilot valve mechanism. Any pressure fluid such as air, natural gas, or other mediums immiscible with the liquid in the surge tank 52, may be used. The operation is as follows:

As the liquid level 21 in still 50 lowers, float ball 19 within float cage 18 lowers correspondingly, causing the eccentric 14 to travel away from the pilot valve body 1 and in so doing, valve pin 2 is caused to follow eccentric 14 by tension spring 3. This change in position of valve pin 2 causes valve A to travel past vent port 5, closing off the vent port while at the same time valve B travels into the open position with respect to pressure fluid supply port 4, whereupon pressure fluid supplied from pipe 57 will pass through supply port 4, thence through operating port 6 into pipe 54, past valve 55 and through pipe 56 into surge tank 52, resulting in an increase in pressure in tank 52; such that the rate of flow of liquid from still 50 through pipe 51 will be decreased by an amount corresponding to the change in pressure differential between tank 52 and still 50. It will be understood, of course, that both still 50 and tank 52 are being maintained under some pressure greater than atmospheric in this particular case. As a result of the increased pressure in tank 52 and the corresponding change in rate of flow of liquid from still 50 through pipe 51, the level of liquid 21 in the still 50 will rise correspondingly until equilibrium conditions are reached, whereupon the float ball 19 will assume a position such that the valve pin 2 will be in a neutral position with no venting of pressure fluid to or from tank 52. If the level of liquid in still 50 rises above the desired point, reverse operations will occur, that is, valve pin 2 will rise due to actuation from the position of float ball 19 and valve B will close supply port 4 while valve A will open vent port 5 so that pressure fluid will flow back from tank 52 through pipe 56, valve 55, pipe 54 through operating port 6, and out of the system through vent port 5, thus altering the pressure differential between still 50 and tank 52 in favor of still 50 and causing more liquid to flow from still 50 through pipe 51 to surge tank 52. This condition will continue until equilibrium conditions are again reached. With this highly sensitive means of control, still levels can be very closely maintained, even though there may be large changes in the volume of liquid being supplied to the still 50, it being only necessary that the size of the pilot valve mechanism and pressure fluid pipes be sufficient to take care of large fluctuations.

This latter adaptation is particularly useful in natural gasoline plants where absorption oil is circulated from the still to the surge tank and where natural gas, air or any other gas is used as a pressuring medium. This adaptation may also be used in any other similar arrangement regardless of the type liquid being transferred and a liquid pressuring medium may also be used provided that it is immiscible with the liquid being transferred. This operation is equally applicable to systems maintained under vacuum, in which cases however, vent port 5 and vent pipe 55 must be maintained under a vacuum slightly greater than that in the system.

The advantage of this latter operation over methods of operation hitherto used, resides principally in greater sensitivity to changes in liquid level in the still 50 and therefore results in more uniform plant operating conditions generally, and in the very large saving in equipment necessary to accomplish satisfactory automatic control. Heretofore control of the still level has necessitated the use of an expensive diaphragm valve in the still outlet pipe, together with block valves on each side of the diaphragm valve as good engineering practice previously required. This diaphragm valve was then controlled from the still level but was independent of the pressure changes in the surge tank. At the same time the pressure in the surge tank had to be controlled independently of the level of liquid in the still, another expensive diaphragm valve being required in this case as well as block valves and an independent pressure responsive control mechanism. The above described method combines the two operations in a single sensitive co-acting arrangement and eliminates the use of the expensive diaphragm valves, block valves, by-passes, etc.

There is still another advantage gained by the use of this method of control over earlier methods. In the operation as formerly practiced, the surge tank was operated at atmospheric pressure with the result that pumps used for withdrawing absorption oil from the surge tank and for returning the oil to the absorption system operated with atmospheric pressure on the suction of the pump. With the above operation the surge tank can be operated very efficiently under 30 pounds or more pressure, with the result that a similar pressure is applied to the pump suction, causing an increase of fully 15% in the rate of circulation of absorption oil which is of great importance in natural gasoline oil absorption processes.

We do not desire to be limited to the specific apparatus and adaptations set out above, but desire to claim all of the variations of our invention as defined in the appended claims.

What we claim and desire to secure by Letters Patent is:

1. An apparatus of the character described, comprising a tank, a second tank in communication therewith to receive liquid therefrom, a source of fluid pressure in direct communication with said second tank and valve means operable in direct proportion to variations in liquid level in said first tank for controlling the fluid pressure in said second tank to change the rate of flow from said first tank to said second tank, whereby the liquid level in said first tank is maintained substantially constant.

2. An apparatus of the character described, comprising a liquid containing tank, a second tank in communication with said first tank to receive liquid therefrom, a source of fluid pressure in communication with said second tank, and means directly responsive to variation in fluid level in said first tank to increase or diminish the fluid pressure in said second tank to decrease or increase, respectively, the flow of liquid between said tanks, whereby the liquid level in said first tank is maintained substantially constant.

3. In a system of feeding liquid from a first tank to a second tank, the method of maintaining the liquid level in said first tank at a substantially constant level, which comprises supplying fluid pressure to said second tank and controlling the said supply in direct proportion to the variation in liquid level in said first tank thereby to control the feed of liquid from said first tank to said second tank.

4. An apparatus for maintaining a substantially constant liquid level in a tank, comprising a tank, a source of liquid supply in communication with said tank, a second tank in liquid flow communication with said first tank, a source of fluid pressure, means for connecting said fluid pressure source with said second tank, said means comprising a valve, said valve in one position serving to place said fluid pressure source and said second tank in communication and in another position to interrupt communication, means for moving said valve in direct response to change in liquid level in said first tank, whereby any change in liquid level of said first tank results in a change in the rate of flow between said first tank and said second tank.

5. An apparatus of the character described, comprising a tank, a source of liquid supply in communication with said tank, a second tank, means for placing said second tank in liquid flow communication with said first tank, a source of fluid under pressure, a valve associated with said second tank for controlling application of said fluid under pressure to said second tank and exhaust of said fluid under pressure therefrom, means for operating said valve in direct response to variations in the level of liquid in said first tank whereby the rate of flow of liquid from said first tank to said second tank maintains a substantially constant liquid level in said first tank.

IRVIN EARL NUTTER.
FLETCHER EDWARD MARTIN.
GERALD W. McCULLOUGH.